(12) United States Patent
Slinkard et al.

(10) Patent No.: US 8,405,058 B2
(45) Date of Patent: *Mar. 26, 2013

(54) METHODS AND APPAREL FOR SIMULTANEOUSLY ATTENUATING ELECTROMAGNETIC FIELDS AND ODORS EMANATING FROM A PERSON

(76) Inventors: Michael D. Slinkard, John Day, OR (US); John M. Maupin, John Day, OR (US); Scott J. Eastman, Olympia, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/701,169

(22) Filed: Feb. 5, 2010

(65) Prior Publication Data

US 2011/0192354 A1 Aug. 11, 2011

(51) Int. Cl.
*G21F 3/02* (2006.01)
(52) U.S. Cl. ............ 250/516.1; 250/505.1; 250/515.1; 2/69; 428/17
(58) Field of Classification Search .......... None
See application file for complete search history.

(56) References Cited

U.S. PATENT DOCUMENTS

| | | | |
|---|---|---|---|
| 3,380,087 A | 4/1968 | Petty et al. | |
| 3,822,403 A * | 7/1974 | Coleman et al. | 455/40 |
| 4,211,980 A | 7/1980 | Stowell | |
| 4,653,473 A * | 3/1987 | Kempe | 128/846 |
| 4,825,877 A * | 5/1989 | Kempe | 128/846 |
| 4,868,580 A * | 9/1989 | Wade | 343/912 |
| 4,926,910 A * | 5/1990 | Wade | 139/425 R |
| 5,097,885 A | 3/1992 | Kitagawa | |
| 5,103,504 A | 4/1992 | Dordevic | |
| 5,203,033 A | 4/1993 | Sheppard et al. | |
| D337,366 S | 7/1993 | Baker | |
| D350,399 S | 9/1994 | Bodrie | |
| 5,377,711 A | 1/1995 | Mueller | |
| 5,521,655 A | 5/1996 | Rhoad | |
| 5,573,857 A | 11/1996 | Auger | |
| 5,578,359 A * | 11/1996 | Forbes et al. | 428/131 |
| 5,621,188 A | 4/1997 | Lee et al. | |

(Continued)

FOREIGN PATENT DOCUMENTS

DE 3217977 A * 11/1983
EP 1 096 604 5/2001

(Continued)

OTHER PUBLICATIONS

U.S. Appl. No. 13/279,307, filed Oct. 23, 2011, Slinkard et al.

(Continued)

*Primary Examiner* — David A Vanore
*Assistant Examiner* — Andrew Smyth
(74) *Attorney, Agent, or Firm* — David S. Alavi

(57) ABSTRACT

Attenuating, while in a given situation, a person's emanated electromagnetic field and the person's scent or odor, by the person wearing article(s) of apparel that include an electromagnetically shielding fabric. The shielding fabric comprises a substantially continuous system of conductive fibers combined with a non-conductive fabric. The conductive fibers attenuate both the emanated electromagnetic field and the emanated scent or odor. The given situation comprises hunting, animal handling, being in or on a body of water, or a human adversarial situation. Attenuating the person's emanated electromagnetic field decreases the likelihood of that emanated field affecting progress or an outcome of the given situation. Attenuating the person's emanated scent or odor decreases the likelihood of that emanated scent or odor affecting progress or the outcome of the given situation.

19 Claims, 6 Drawing Sheets

U.S. PATENT DOCUMENTS

| | | | | |
|---|---|---|---|---|
| 5,675,838 | A | 10/1997 | Hollinger | |
| 5,676,812 | A | 10/1997 | Kadokura | |
| 5,767,933 | A | 6/1998 | Hagan | |
| 5,935,706 | A | 8/1999 | Hoover et al. | |
| 5,968,854 | A | 10/1999 | Akopian et al. | |
| 5,983,913 | A | 11/1999 | Fargason | |
| 6,061,828 | A | 5/2000 | Josephs | |
| 6,127,022 | A * | 10/2000 | Pretorius | 428/195.1 |
| 6,134,718 | A | 10/2000 | Sesselmann | |
| 6,146,351 | A * | 11/2000 | Kempe | 602/75 |
| 6,265,466 | B1 * | 7/2001 | Glatkowski et al. | 523/137 |
| 6,269,489 | B1 | 8/2001 | Heath | |
| 6,299,812 | B1 | 10/2001 | Newman | |
| 6,539,966 | B2 | 4/2003 | Raines et al. | |
| 6,632,499 | B1 | 10/2003 | Marks et al. | |
| 6,694,995 | B1 * | 2/2004 | Ransom | 135/128 |
| 6,868,854 | B2 * | 3/2005 | Kempe | 128/849 |
| 6,941,961 | B1 | 9/2005 | Eastman | |
| 7,100,626 | B2 | 9/2006 | Livacich | |
| 7,134,857 | B2 | 11/2006 | Andrady | |
| 7,182,091 | B2 | 2/2007 | Maddox | |
| 7,196,023 | B2 | 3/2007 | Langley et al. | |
| 7,208,115 | B2 | 4/2007 | Sheridan et al. | |
| 7,354,877 | B2 * | 4/2008 | Rosenberger et al. | 442/194 |
| 7,461,647 | B1 * | 12/2008 | Slinkard | 124/86 |
| 7,565,909 | B2 | 7/2009 | Reis et al. | |
| 8,188,452 | B2 * | 5/2012 | Slinkard et al. | 250/516.1 |
| 8,203,129 | B2 * | 6/2012 | Slinkard et al. | 250/516.1 |
| 8,212,229 | B2 * | 7/2012 | Slinkard et al. | 250/516.1 |
| 2001/0000849 | A1 * | 5/2001 | Siman-Tov et al. | 62/259.3 |
| 2002/0069449 | A1 | 6/2002 | Blutstein et al. | |
| 2002/0069904 | A1 | 6/2002 | Robinson | |
| 2003/0233694 | A1 * | 12/2003 | Wescombe-Down | 2/2.15 |
| 2004/0053780 | A1 * | 3/2004 | Jiang et al. | 502/182 |
| 2004/0068415 | A1 | 4/2004 | Solomon | |
| 2004/0107474 | A1 * | 6/2004 | Sesselmann | 2/69 |
| 2004/0188890 | A1 * | 9/2004 | Sheridan et al. | 264/510 |
| 2004/0207566 | A1 * | 10/2004 | Essig et al. | 343/878 |
| 2004/0209051 | A1 * | 10/2004 | Santos et al. | 428/195.1 |
| 2006/0033674 | A1 * | 2/2006 | Essig et al. | 343/914 |
| 2006/0094315 | A1 * | 5/2006 | Brodsky | 441/80 |
| 2006/0147698 | A1 * | 7/2006 | Carroll et al. | 428/316.6 |
| 2006/0170221 | A1 | 8/2006 | Wobben | |
| 2006/0264137 | A1 | 11/2006 | Ishihara et al. | |
| 2007/0226868 | A1 | 10/2007 | Hunt | |
| 2008/0210175 | A1 | 9/2008 | Bryce | |
| 2009/0036012 | A1 * | 2/2009 | Nhan et al. | 442/268 |
| 2009/0184269 | A1 * | 7/2009 | Rees | 250/516.1 |
| 2011/0057127 | A1 * | 3/2011 | Slinkard et al. | 250/505.1 |
| 2011/0072550 | A1 * | 3/2011 | Slinkard et al. | 2/69 |
| 2011/0073361 | A1 * | 3/2011 | Slinkard et al. | 174/388 |
| 2011/0079257 | A1 * | 4/2011 | Slinkard et al. | 135/96 |
| 2011/0192354 | A1 * | 8/2011 | Slinkard et al. | 119/712 |
| 2012/0273699 | A1 * | 11/2012 | Slinkard et al. | 250/519.1 |

FOREIGN PATENT DOCUMENTS

| | | | |
|---|---|---|---|
| EP | 1096604 A1 * | 5/2001 | |
| JP | 10046443 A * | 2/1998 | |
| JP | 2002-054055 | 2/2002 | |
| KR | 10-1994-0010630 | 10/1994 | |
| KR | 10-2000-0007920 | 2/2000 | |
| KR | 10-2003-0061535 | 7/2003 | |
| KR | 10-0433389 | 5/2004 | |
| KR | 20-0416156 | 5/2006 | |
| WO | WO 90/09473 | 8/1990 | |
| WO | WO 97/48964 | 12/1997 | |
| WO | WO 9748964 A1 * | 12/1997 | |
| WO | WO 2010/124145 | 10/2010 | |
| WO | WO 2010124145 A2 * | 10/2010 | |

OTHER PUBLICATIONS

Office Action dated Apr. 13, 2011 in co-owned U.S. Appl. No. 12/347,967.
Office Action dated Jan. 5, 2012 in co-owned U.S. Appl. No. 12/347,967.
Notice of Allowance dated Apr. 23, 2012 in co-owned U.S. Appl. No. 12/347,967.
Office Action dated Aug. 13, 2012 in co-owned U.S. Appl. No. 12/347,971.
Office Action dated Jun. 21, 2011 in co-owned U.S. Appl. No. 12/428,763.
Notice of Allowance dated May 21, 2012 in co-owned U.S. Appl. No. 12/428,763.
Office Action dated Apr. 18, 2011 in co-owned U.S. Appl. No. 12/549,698.
Office Action dated Jan. 6, 2012 in co-owned U.S. Appl. No. 12/549,698.
Notice of Allowance dated May 7, 2012 in co-owned U.S. Appl. No. 12/549,698.
Office Action dated Oct. 14, 2011 in co-owned U.S. Appl. No. 12/347,971.
Office Action dated Sep. 3, 2010 in co-owned U.S. Appl. No. 12/347,971.
Reply dated Nov. 23, 2010 in co-owned U.S. Appl. No. 12/347,971.
International Search Report and Written Opinion of the International Searching Authority in co-owned App No. PCT/US2010/032133.
Office action dated Dec. 10, 2010 in co-owned U.S. Appl. No. 12/428,763.
Office Action dated Feb. 7, 2011 in co-owned U.S. Appl. No. 12/347,971.
U.S. Appl. No. 12/347,967, filed Dec. 31, 2008, Slinkard et al.
U.S. Appl. No. 12/347,971, filed Dec. 31, 2008, Slinkard et al.
U.S. Appl. No. 12/428,763, filed Apr. 23, 2009, Slinkard et al.
U.S. Appl. No. 12/549,698, filed Aug. 28, 2009, Slinkard et al.
Loscher et al; Conspicuous behavioral abnormalities in a dairy cow herd near a TV and Radio transmitting antenna; Practical Veterinary Surgeon vol. 79 No. 5 p. 437 (1998).
Trzeciak et al; Behavioral effects of long-term exposure to magnetic fields in rats; Bioelectromagnetics vol. 14 No. 4 p. 297 (1993).
Pyrek, Kelly M.; Antimocrobials: Healthcare's Silver Bullet Against HAIs?; www.infectioncontroltoday.com; online article posted Aug. 28, 2008.

* cited by examiner

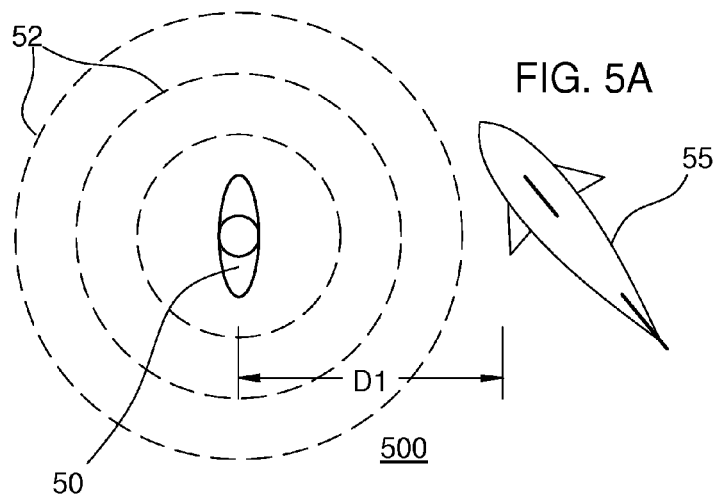
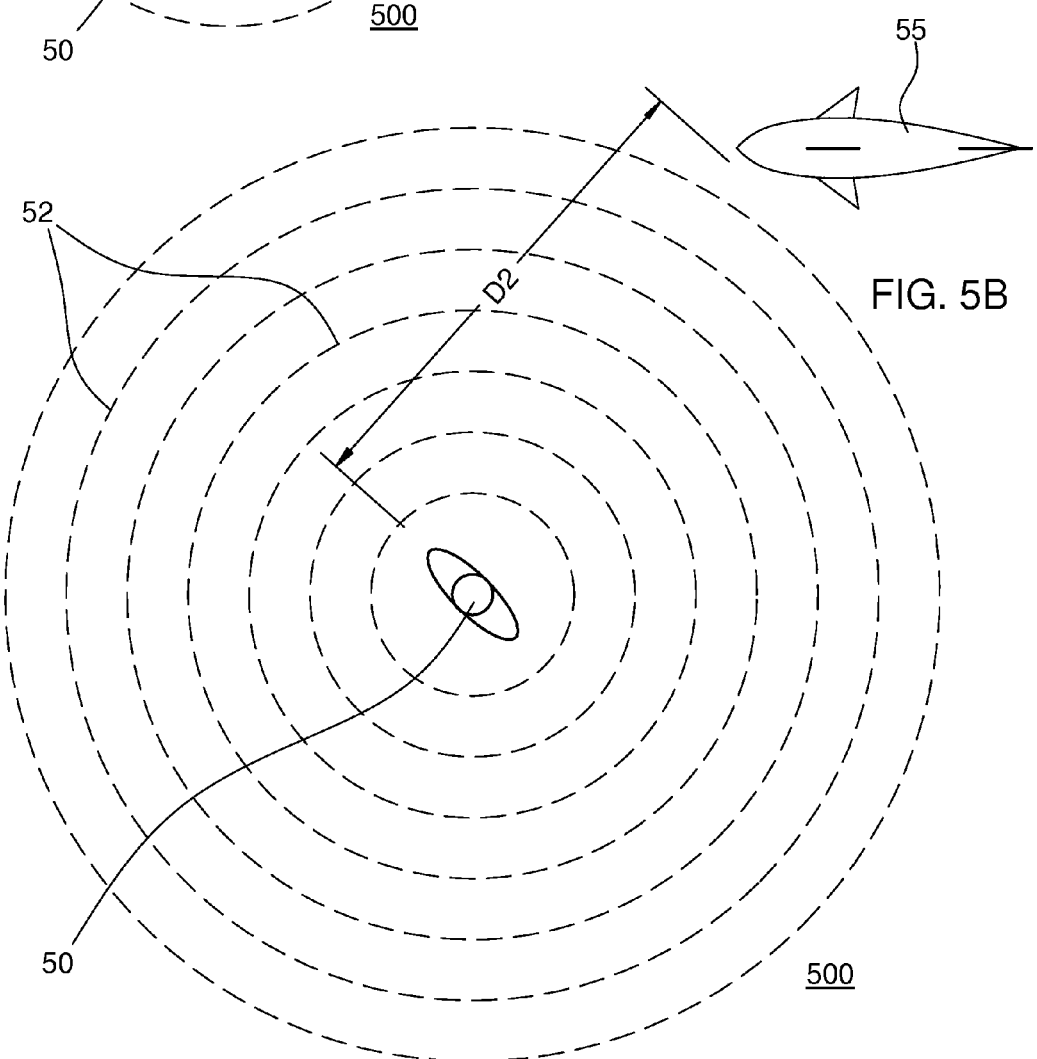

METHODS AND APPAREL FOR SIMULTANEOUSLY ATTENUATING ELECTROMAGNETIC FIELDS AND ODORS EMANATING FROM A PERSON

BACKGROUND

The field of the present invention relates to apparel worn by a person in locations or situations wherein simultaneous attenuation of electromagnetic fields and odors emanating from the person would be desirable. In particular, methods and apparel are disclosed for simultaneously attenuating electromagnetic fields and odors emanating from the person.

The subject matter disclosed or claimed herein is related to subject matter disclosed or claimed in: (i) U.S. non-provisional application Ser. No. 12/347,967 filed Dec. 31, 2008 in the names of Michael D. Slinkard and John M. Maupin and entitled "Methods and apparel for attenuating electromagnetic fields emanating from a hunter" (now U.S. Pat. No. 8,188,452); (ii) U.S. non-provisional application Ser. No. 12/347,971 filed Dec. 31, 2008 in the names of Michael D. Slinkard and John M. Maupin and entitled "Methods and hunting blind for attenuating electromagnetic fields emanating from a hunter"; (iii) U.S. non-provisional application Ser. No. 12/428,763 filed Apr. 23, 2009 in the names of Michael D. Slinkard and John M. Maupin and entitled "Methods and apparel for attenuating electromagnetic fields emanating from an animal handler" (now U.S. Pat. No. 8,212,229); and (iv) U.S. non-provisional application Ser. No. 12/549,698 filed Aug. 28, 2009 in the names of Michael D. Slinkard and John M. Maupin and entitled "Methods and apparel for attenuating electromagnetic fields emanating from a person in or on a body of water" (now U.S. Pat. No. 8,203,129). Each of said applications is incorporated by reference as if fully set forth herein.

It is known that the human body generates electromagnetic fields during normal body functions, and that those fields can increase in strength with increased activity, excitement, emotion, or attention. For example, brain activity, nerve activity, and muscle activity all result in electric fields that emanate from the body. Detection and characterization of such fields is the basis for the conventional clinical techniques of electrocardiography (i.e., ECG or EKG), electroencephalography (i.e., EEG), and electromyelography (i.e., EMG). For the purposes of the present disclosure or claims, "electromagnetic" is intended to denote those fields that have temporal variations well below so-called optical frequencies (i.e., having frequency components no greater than about 1 gigahertz (GHz), typically no greater than about 1 megahertz (MHz), and often no greater than about 1 kilohertz (kHz).

It is also known that at least some animals can detect or respond to electromagnetic fields. For example, sharks detect electric fields emanating from prey by means of special sensing organs called the ampullae of Lorenzini (http://en.wikipedia.org/wiki/Ampullae_of_Lorenzini). A shark-repelling system is disclosed in U.S. Pat. No. 4,211,980 that generates an electric field to drive away the sharks. Other animals are believed to navigate their natural migratory routes using the earth's magnetic field (http://www.pbs.org/wgbh/nova/magnetic/animals.html).

Fabrics exist that are adapted to attenuate or block electromagnetic fields. They typically include electrically conductive fibers (metal, carbon nanotubes, or other conductive fibers) incorporated into the fabric along with more typical textile fibers. Garments constructed from such fabrics are conventionally used to shield a human wearer from surrounding electromagnetic fields. Such shielding can be usefully employed into safety equipment or apparel, can be worn by or applied to a patient to provide various health or therapeutic benefits, or for other purposes. Examples of such fabrics and their uses can be found in the following references, each of which is incorporated by reference as if fully set forth herein:

U.S. Pat. No. 7,354,877 entitled "Carbon nanotube fabrics" issued Apr. 8, 2008 to Rosenberger et al;

U.S. Pat. No. 6,868,854 entitled "Method and article for treatment of fibromyalgia" issued Mar. 22, 2005 to Kempe;

Pat. Pub. No. 2004/0053780 entitled "Method for fabricating nanotube yarn" published Mar. 18, 2004 in the names of Jiang et al;

U.S. Pat. No. 6,265,466 entitled "Electromagnetic shielding composite comprising nanotubes" issued Jul. 24, 2001 to Glatkowski et al;

U.S. Pat. No. 6,146,351 entitled "Method of reducing delayed onset muscle soreness" issued Nov. 14, 2000 to Kempe;

U.S. Pat. No. 5,621,188 entitled "Air permeable electromagnetic shielding medium" issued Apr. 15, 1997 to Lee et al;

U.S. Pat. No. 4,825,877 entitled "Method of pain reduction using radiation-shielding textiles" issued May 2, 1989 to Kempe; and U.S. Pat. No. 4,653,473 entitled "Method and article for pain reduction using radiation-shielding textile" issued Mar. 31, 1987 to Kempe.

There is no teaching or suggestion in the prior art to attenuate or block electromagnetic fields emanating from a human body, or that such attenuation or blocking would be desirable.

SUMMARY

A method comprises attenuating, while in a given situation, a person's emanated electromagnetic field and that person's scent or odor. The emanated electromagnetic field and the emanated scent or odor are attenuated by the person wearing one or more articles of apparel that include an electromagnetically shielding fabric. The shielding fabric comprises a substantially continuous system of conductive fibers combined with a non-conductive fabric. The conductive fibers attenuate the emanated electromagnetic field and the emanated scent or odor. The given situation comprises hunting, animal handling, being in or on a body of water, or a human adversarial situation. Attenuating the person's emanated electromagnetic field decreases the likelihood of that emanated field affecting progress or an outcome of the given situation. Attenuating the person's emanated scent or odor decreases the likelihood of that emanated scent or odor affecting progress or the outcome of the given situation. If the person is oneself, then the method is performed by wearing one or more articles of the apparel while in the given situation. If the person is another user, then the method is performed by providing one or more articles of the apparel to the user and instructing the user to wear, while involved in the given situation, at least one of the articles of apparel.

Objects and advantages pertaining to apparel incorporating electromagnetic shielding fabric comprising conductive fibers that also attenuate scent or odor may become apparent upon referring to the exemplary embodiments illustrated in the drawings and disclosed in the following written description or appended claims.

BRIEF DESCRIPTION OF THE DRAWINGS

FIGS. 5A and 5B are schematic top views illustrating the approach of a water-borne predator toward a person in a body of water with and without, respectively, electromagnetically shielding apparel.

The embodiments shown in the Figures are exemplary, and should not be construed as limiting the scope of the present disclosure or appended claims.

DETAILED DESCRIPTION OF EMBODIMENTS

Electromagnetically shielding apparel that also attenuates the scent or odor of a wearer can be advantageously employed during a variety of situations in which attenuation of emanated electromagnetic fields and attenuation of emanated scent or odor might be desirable. Such apparel includes shielding fabric that comprises a substantially continuous system of conductive fibers combined with a non-conductive fabric. The conductive fibers attenuate electromagnetic fields emanating from the wearer and thereby decrease the likelihood of such emanated fields affecting progress or an outcome of a given situation in which the wearer is involved (described further below). Conductive fibers can be employed that also attenuate a scent or odor emanating from the wearer of the apparel. Emanated scent or odor can arise from the wearer (e.g., sweat or pheromones) or can arise from microbial growth in the apparel. Conductive fibers can be employed that attenuate the scent or odor by at least partly absorbing it or by inhibiting microbial growth in the apparel. Attenuating scent or odor emanating from the wearer decreases the likelihood of such emanated scent or odor affecting progress or the outcome of the given situation in which the wearer is involved (described further below). Apparel disclosed herein that attenuates both electromagnetic fields and scent or odor emanating from a wearer can be generally referred to as "attenuating apparel," and that phrase shall be understood to encompass apparel constructed from fabric that incorporates conductive fibers that also attenuate scent or odor.

Figure 4A:
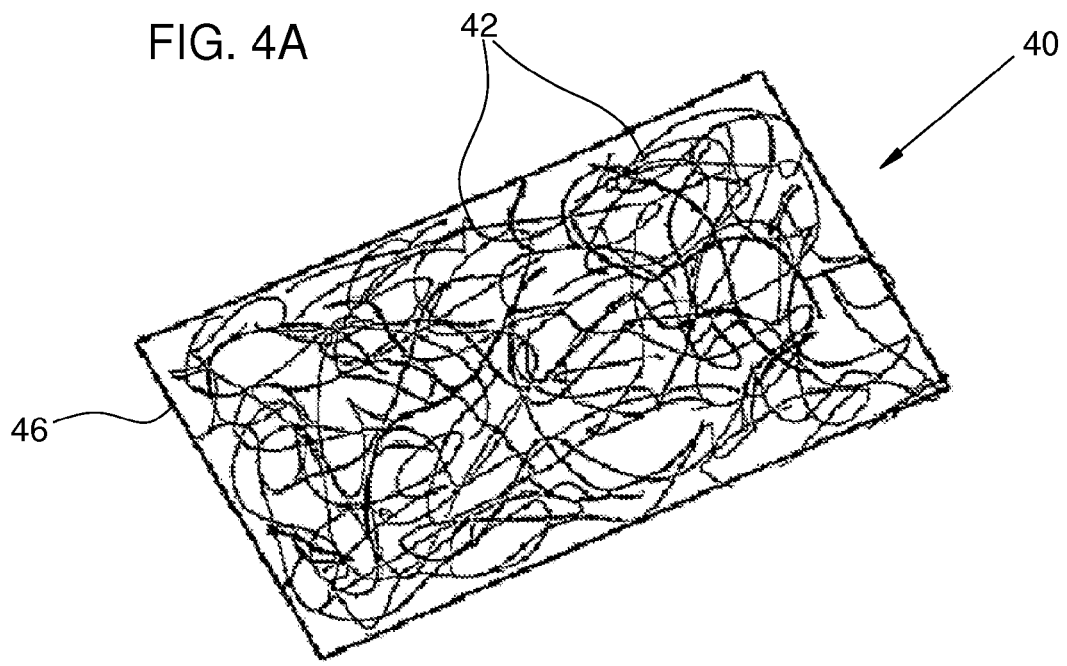
FIGS. 4A and 4B illustrate exemplary electromagnetically shielding fabrics.
Figure 4B:
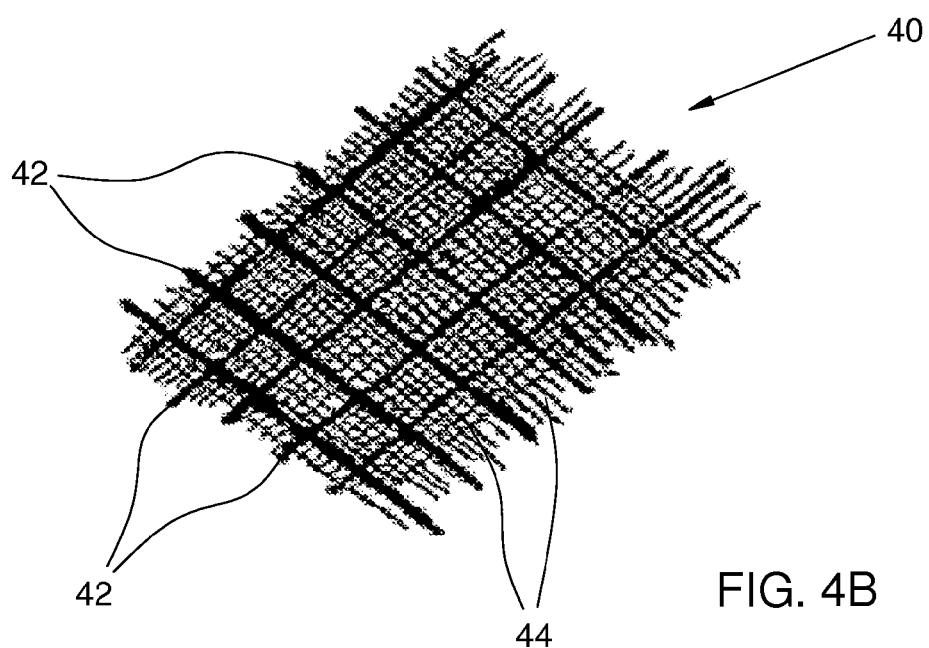

Any suitable fabric can be employed that incorporates conductive fibers of any suitable type to form a substantially continuous electrical conduction network in the fabric. The conduction network 42 can be arranged irregularly (as in the example of FIG. 4A), in a grid-like pattern (as in the example of FIG. 4B), or in any other suitable, desirable, or practicable arrangement. The conductive fibers can be intermingled with non-conductive fibers 44 to form the shielding fabric 40 (in a regular, interwoven arrangement or in an irregular arrangement). Examples of suitable fibers include typical textile fibers, e.g., wool, silk, or other natural polyamide fibers; cotton, rayon, or other cellulosic fibers; or nylon, polyester, Kevlar, or other synthetic fibers. A particular fabric type (i.e., a particular combination of textile fiber and fabric construction, e.g., woven or non-woven) can be selected based on the intended use of the apparel. Instead of intermingling conductive and non-conductive fibers, the conductive fibers 42 (regularly or irregularly arranged) can be applied to a surface of a non-conducting fabric 46 to form the shielding fabric 40. In that latter case, the non-conducting fabric can comprise a woven or non-woven textile fabric, or can comprise a substantially continuous sheet fabric such as a plastic sheet or polymer film. The conductive fibers can be combined with the non-conducting fabric in any suitable, desirable, or practicable way, including those described above or others not explicitly disclosed herein, and all such combinations shall fall within the scope of the present disclosure or appended claims.

Any suitable conductive fibers can be employed that provide sufficient conductivity for providing electromagnetic shielding and that can form fibers suitable for incorporation into a fabric. In various examples disclosed in the incorporated references, the conductive fibers comprise stainless steel, copper, silver, carbon (e.g., fibers, graphite, or nanotubes), conductive ceramic, conductive polymer, or conductive nanotubes. Another example is Farabloc® fabric described in incorporated U.S. Pat. Nos. 4,653,473, 4,825,877, 6,146,351, and 6,868,854. Any suitable composition of the electromagnetic shielding fabric can be employed for electromagnetic shielding. In various examples of such fabrics disclosed in the incorporated references, the fabric includes between about 2% and about 35% by weight of the conductive fibers. Other exemplary fabrics can include greater than about 5%, greater than about 10%, greater than about 15%, greater than about 20%, greater than about 25%, or greater than about 30% by weight of the conductive fibers, while still other exemplary fabrics can include less than about 30%, less than about 25%, less than about 20%, less than about 15%, less than about 10%, or less than about 5% by weight of the conductive fibers. Fabrics having greater than 35% by weight of conductive fibers can be employed if suitable, desirable, or practicable. Higher compositions of conductive fiber typically can provide greater electromagnetic shielding, but might also come at a higher cost or weight, or might yield a fabric with other undesirable properties. Any suitably optimized composition can be used in a given situation.

To provide apparel that attenuates a wearer's emanated scent or odor in addition to attenuating the wearer's emanated electromagnetic field, conducting fibers are employed that provide both of those functions. In one example, copper or silver conductive fibers can be employed to attenuate emanated electromagnetic fields (due to their conductivity) and to attenuate emanated scent or odor (due to their observed antimicrobial properties). Silver or copper conductive fibers can be incorporated in to the apparel in any suitable fabric type at any suitable composition. In another example, conductive carbon fibers can be employed to attenuate both emanated electromagnetic fields and emanated scent or odor. It has been observed that conductive carbon fibers incorporated into a shielding fabric appear to absorb at least a portion of emanated scent or odor. Multifilament carbon fiber yarn has been observed to attenuate scent or odor more effectively than monofilament yarn. An exemplary fabric for constructing apparel can comprise a 20 denier, three filament carbon fiber yarn twisted with 50 denier polyester yarn and knitted or woven into a textile fabric. Any suitable yarn type or density can be employed.

Situations in which it can be desirable, useful, or beneficial to attenuate emanated electromagnetic fields and emanated scents or odors can include hunting, animal handling, being in or on a body of water, or human adversarial situations. Use of attenuating apparel in each of those situations is described below.

An exemplary method comprises attenuating, while hunting, the electromagnetic field emanated by a hunter and a scent or odor emanated by the hunter. Hereafter the term "hunter" shall include a hunter or an observer of wildlife, and "hunting" shall include hunting or observing. The electromagnetic field and scent/odor are attenuated by one or more articles of apparel worn by the hunter while hunting. The article comprises an electromagnetically shielding fabric. The fabric comprises a substantially continuous system of conductive fibers combined with a non-conductive fabric, and the conductive fibers also attenuate the hunter's scent/odor by at least partly absorbing it or by inhibiting microbial growth. The fabric or apparel can exhibit other desirable or useful characteristics, features, or properties, e.g., mechanical strength, tear resistance, water resistance, suitable coloring or camouflage, or insulation. The method can include providing one or more such articles of apparel to a hunter and instructing that hunter to wear at least one of the articles while hunting. The method can also include constructing at least one of the articles of apparel prior to providing it to the hunter. There is no teaching or suggestion in the prior art to attenuate or block electromagnetic fields and scent/odor emanating from a hunter while hunting (or an observer while observing wildlife), or that such attenuation or blocking would be desirable.

By attenuating or blocking both electromagnetic fields and scent/odor emanating from a hunter or observer, that hunter or observer can more closely approach an animal without detection, or detection of that hunter or observer by the animal from a given distance can be made less likely. It is therefore desirable to provide hunting apparel (including, e.g., clothing, footwear, headwear; or including a hunting blind) that attenuates or blocks electromagnetic fields and scent/odor emanating from the hunter or observer. Decreasing the likelihood of detection of the hunter or observer by an animal that is sensitive to electromagnetic fields and to scent/odor in turn increases the likelihood that the hunter will be successful in taking the animal, or that the observer will be successful in making the desired observation of the animal.

Figure 1A:
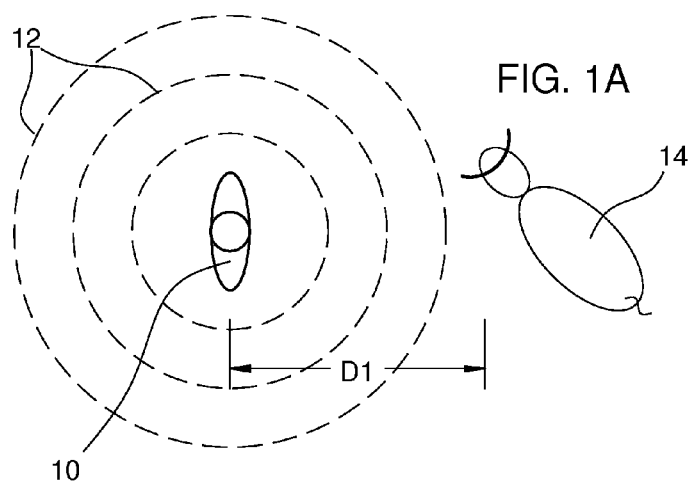
FIGS. 1A and 1B are schematic top views illustrating the approach of a hunter toward a prey animal (or vice versa) with and without, respectively, electromagnetically shielding apparel or hunting blind.
Figure 1B:
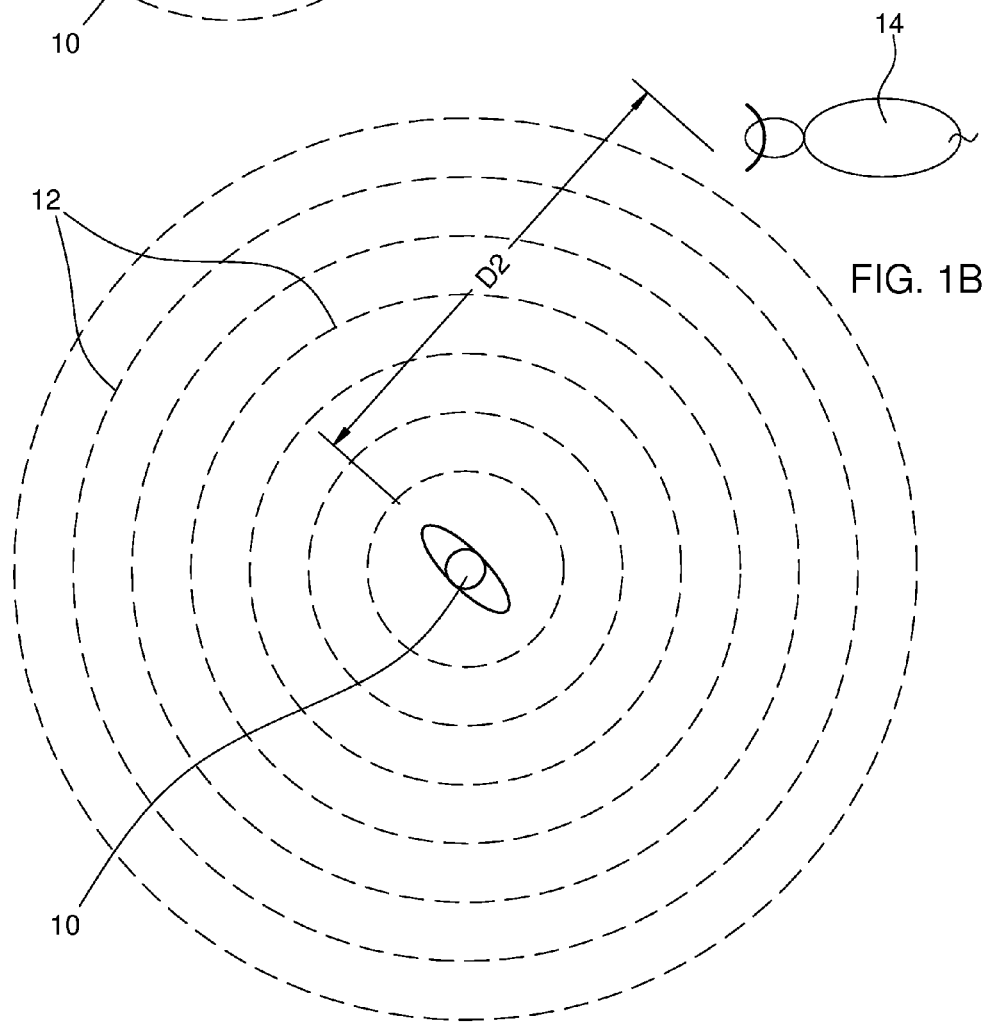

The hunter wears the article of attenuating apparel while hunting. The electromagnetically shielding fabric blocks or attenuates an electromagnetic field emanating from the hunter's body and attenuates scent or odor emanating from the hunter's body or other apparel, thereby decreasing the likelihood that he or she will be detected by a prey animal sensitive to electromagnetic fields or scents/odors. An electromagnetic field 12 (or a scent or odor) emanated by a hunter 10 and thus attenuated can be detected by an animal 14 at a maximum distance D1, as in FIG. 1A, that is smaller than the maximum detection distance D2 at which an unattenuated field 12 (or scent or odor) can be detected by that same animal 14, as in FIG. 1B. The hunter 10 can therefore approach the animal 14 more closely without detection, facilitating the kill, or an observer can approach the animal more closely without detection, facilitating the observation. In measurements of electromagnetic fields emanating from a human body, reductions of field strength ranging from about 38% to about 65% have been observed, as illustrated by the experimental results disclosed in an Appendix attached to application Ser. Nos. 12/347,967, 12/347,971, and 12/428,763 (already incorporated by reference). Any suitable, desirable, or practicable reduction of emanated electromagnetic field strength or emanated scent or odor intensity shall fall within the scope of the present disclosure or appended claims.

It is possible in some instances of hunting or observing that a human hunter might become the prey of a predatory animal, either the animal he is hunting or another animal in the same habitat. In those circumstances, the attenuating apparel can reduce the likelihood that the predatory animal will locate the human hunter by detecting the electromagnetic field emanated by the hunter or by picking up the hunter's scent or odor.

Figure 2:
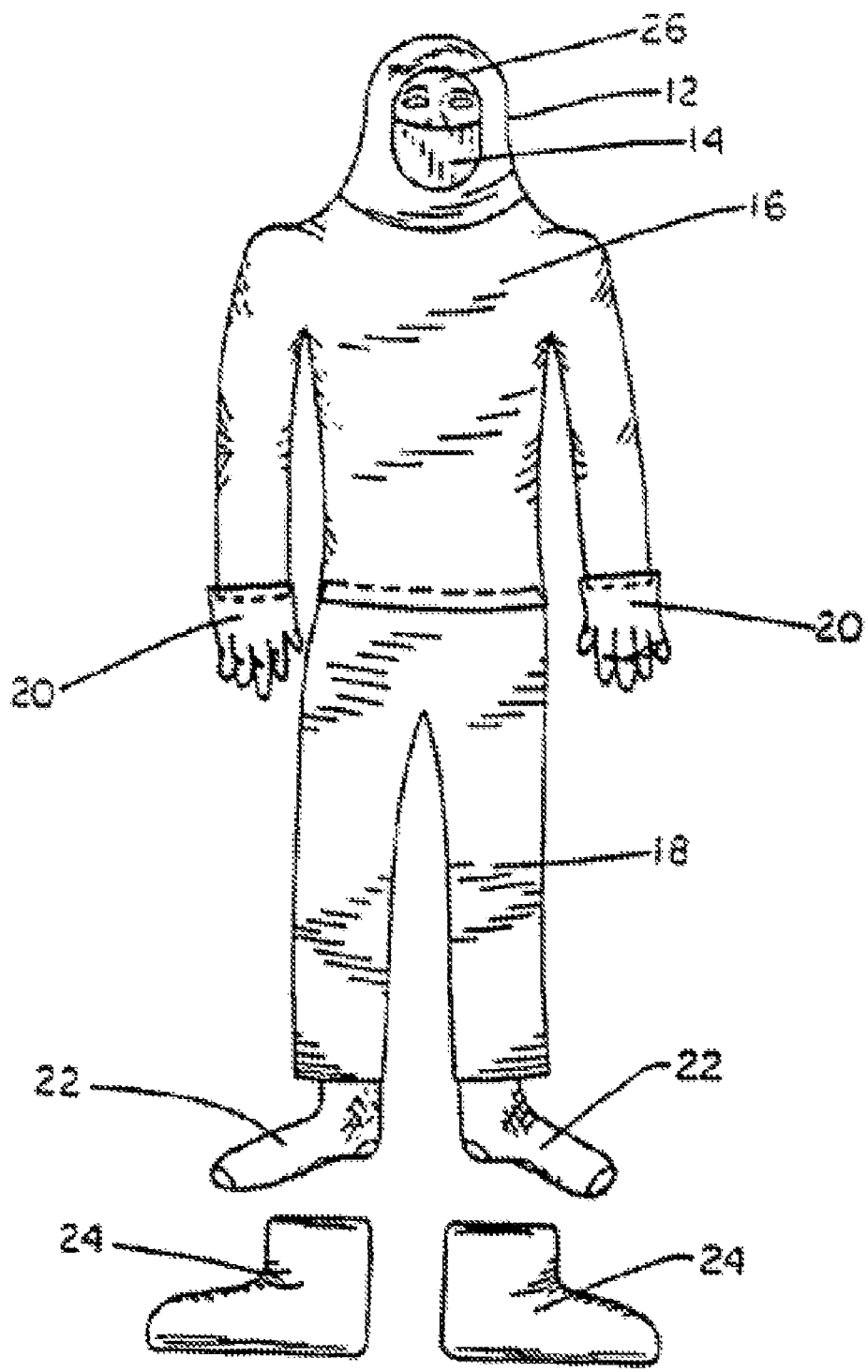
FIG. 2 illustrates various exemplary articles of electromagnetically shielding apparel.

As illustrated by the examples of FIG. 2, an article of hunting apparel incorporating electromagnetically shielding fabric that also attenuates scent or odor can comprise an article of clothing (e.g., pants 18, shorts, shirt 16, undergarments, leggings, sleeves, gloves 20, mittens, jacket, coat, vest, overalls, waders, or snowsuit), footwear (e.g., shoes, boots 24, socks 22, or boot liners), headwear (e.g., hood 12, facemask 14, or hat), or eyewear (e.g., glasses or goggles 26).

Another exemplary method comprises attenuating, while handling an animal, the electromagnetic field and scent/odor emanated by a handler of the animal. The electromagnetic field and scent/odor are attenuated by one or more articles of attenuating apparel worn by the handler while handling the animal. As above, the article of attenuating apparel comprises an electromagnetically shielding fabric. The fabric comprises a substantially continuous system of conductive fibers combined with a non-conductive fabric, and the conductive fibers also attenuate the hunter's scent or odor by at least partly absorbing it or by inhibiting microbial growth. The method can include providing one or more articles of attenuating apparel to a handler and instructing that handler to wear the article while handling the animal. That method can also include constructing at least one of the articles of attenuating apparel prior to providing it to the handler. There is no teaching or suggestion in the prior art to attenuate or block electromagnetic fields and scent/odor emanating from an animal handler while handling an animal, or that such attenuation or blocking would be desirable.

Attenuating or blocking both electromagnetic fields and scent/odor emanating from a person can be advantageous while handling an animal. It has been observed frequently that animals can be affected by emotional responses or the emotional state of a person nearby, e.g., a person's anxiety can cause nervous or uneasy behavior of the animal, or a person's fear can trigger an aggressive response from the animal. Sensing by an animal of a person's emotional state or response might occur in a variety of ways, e.g., by detecting by smell sweat or pheromones released as a result of the person's emotional state or response, or by sensing emotion-related electromagnetic fields resulting from the person's emotional state or responses. Attenuating or blocking fields and scent/odor emanating from the person can advantageously reduce the effect on the animal of the emotional state or an emotional response of the person.

"Handling" an animal shall encompass, inter alia: (i) literal handling of the animal by holding or touching the animal; (ii) handling the animal using a rope, chain, leash, muzzle, harness, saddle, reins, yoke, prod, whip, or other equipment; (iii) feeding the animal; (iv) guiding, directing, herding, capturing, or restraining the animal; (v) riding the animal; (vi) using the animal to pull or push a vehicle, object, or equipment of any sort; (vii) using the animal in a performance, display, or demonstration; (viii) training the animal for any purpose, including but not limited to those listed here; (ix) conducting veterinary examination or treatment of the animal; (x) using an animal to train another handler to perform any animal-handling task, including but not limited to those listed here; (xi) using an animal to learn from another handler to perform any animal-handling task, including but not limited to those listed here; and (xii) other activities that involve interaction between a person and an animal.

An animal handler wears the article of attenuating apparel while handling the animal. Instead or in addition, other people likely to be near the animal (i.e., bystanders) can wear articles of attenuating apparel; for purposes of the present disclosure or appended claims, the terms "handler" and "handling" shall be construed as including both those persons interacting directly with the animal as well as bystanders that might interact with the animal indirectly (e.g., by being near enough to affect the animal via emanated scent/odor or emanated electromagnetic fields). By blocking or attenuating electromagnetic fields and scent/odor emanating from a person near the animal, the animal is less likely to sense such fields and scent/odor that arise from an emotional response or state of the person, and is therefore also less likely to react to that emotional state or reaction. In particular, emotional responses or states that might cause undesirable behavior of the animal (e.g., flight or aggression) are less likely to be sensed by the animal. Such emotional states or responses can arise for a variety of reasons, e.g., a handler's or bystander's fear of the animal, a handler's frustration with the animal's behavior or response (or lack thereof) to its training, a handler's frustration or discomfort while being taught how to handle an animal, or an instructor's frustration at a handler trainee's response (or lack thereof) to his/her instruction.

Another exemplary method comprises attenuating, while a person is in or on a body of water, the electromagnetic field and scent/odor emanated by the person. In one example, conductive fibers that also attenuate scent or odor can be incorporated into any suitable attenuating apparel worn while the wearer 50 is in or on a body of water 500 (e.g., river, lake, sea, ocean), as in FIGS. 5A-5B. Blocking or attenuating the electromagnetic field 52 and scent/odor emanated by the person 50 can reduce the likelihood of detection of the wearer 50 by an aquatic or marine water-borne predator 55, e.g., a shark. Without the attenuating apparel (as in FIG. 5B), the predator 55 might detect the person in the water from a larger distance D2. With attenuating apparel (as in FIG. 5A), the predator 55 might only detect the person 50 in the water after approaching more closely (distance D1 that is smaller than distance D2). Shielding of a person's emanated electromagnetic field and attenuating scent or odor emanating from that person while in a body of water can be particularly advantageous under conditions of poor underwater visibility, wherein a water-borne predator might rely more heavily on electromagnetic-based or scent-based prey detection, and wherein a person would have more difficulty seeing and avoiding a water-borne predator. Attenuating apparel can be provided to or worn by, e.g., bathers, waders, swimmers, surfers, boaters, sailors, personal water craft users, wind surfers, para-sailors, para-surfers, snorkelers, or divers (free, scuba, or other) in a river, lake, sea, ocean, or other body of water. Examples of suitable articles of attenuating apparel can include, but are not limited to, trunks, shirts, bathing suits, wet suits, dry suits, deck apparel, and so on. Some examples are shown in FIG. 2. Attenuating apparel can be included with other water survival gear on a vessel or aircraft, or attenuating fabric can be incorporated into conventional survival gear, e.g., a life vest, life raft, or exposure suit. There is no teaching or suggestion in the prior art to attenuate or block electromagnetic fields and scent/odor emanating from a person in or on a body of water, or that such attenuation or blocking would be desirable.

Another exemplary method comprises attenuating, while a person is in an adversarial situation, the electromagnetic field and scent/odor emanated by the person. The electromagnetic field and scent/odor are attenuated by one or more articles of attenuating apparel worn by the person while involved in the adversarial situation. As above, the article of attenuating apparel comprises an electromagnetically shielding fabric. The fabric comprises a substantially continuous system of conductive fibers combined with a non-conductive fabric, and the conductive fibers also attenuate the hunter's scent or odor by at least partly absorbing it or by inhibiting microbial growth. The method can include providing one or more articles of attenuating apparel to a person and instructing that person to wear the article while involved in an adversarial situation. That method can also include constructing at least one of the articles of attenuating apparel prior to providing it to the person. There is no teaching or suggestion in the prior art to attenuate or block electromagnetic fields and scent/odor emanating from a person while involved in an adversarial situation, or that such attenuation or blocking would be desirable.

Attenuating or blocking both electromagnetic fields and scent/odor emanating from a person can be advantageous while involved in an adversarial situation. A human adversary can be affected by emotional responses or the emotional state of a person nearby, e.g., a person's anxiety can alert or cue a human adversary, or a person's fear can trigger an aggressive response from the human adversary. Sensing by a human adversary of a person's emotional state or response might occur in a variety of ways, e.g., by detecting by smell sweat or pheromones released as a result of the person's emotional state or response, or by sensing emotion-related electromagnetic fields resulting from the person's emotional state or responses. Attenuating or blocking fields and scent/odor emanating from the person can advantageously reduce any alerting or cueing of a human adversary arising from an emotional state or an emotional response of the person, and thereby reduce any advantage that might have been gained from that alerting or cueing.

An "adversarial situation" shall include any situation in which a person involved vies with a human adversary. The nature of such situations can vary widely, and can include, inter alia: (i) a team or individual athletic contest of any sort (particularly those requiring a high degree of mental concentration); (ii) a mental or verbal contest of any sort (e.g., a debate); (iii) board or card games of any sort; (iv) an interview, debriefing, or interrogation (either participant); (v) law enforcement situations; (vi) military, combat, or tactical situations; (vii) covert operations; or (viii) other adversarial situations involving interaction between a person and a human adversary.

A person wears the article of attenuating apparel while involved in an adversarial situation (e.g., a poker player at the gaming table; a golfer on the course; or a police detective in the interrogation room). Instead or in addition, other people likely to be near the adversarial situation (i.e., spectators or bystanders) can wear articles of attenuating apparel; the following description applied to both a person involved in the adversarial situation as well as spectators, bystanders, or other persons nearby (e.g., near enough to affect the persons or adversaries involved in the adversarial situation via emanated scent/odor or emanated electromagnetic fields). By blocking or attenuating electromagnetic fields and scent/odor emanating from a person near a human adversary, the adversary is less likely to sense such fields and scent/odor that arise from an emotional response or state of the person, and is therefore also less likely to react to that emotional state or reaction. In particular, emotional responses or states that might alert or cue the adversary are less likely to be sensed by the adversary. Such emotional states or responses can arise for a variety of reasons, e.g., a person's or bystander's fear of the human adversary, or a handler's frustration with the adversary's behavior or response (or lack thereof).

Any other use of attenuating apparel, in a situation wherein blocking or attenuation of the wearer's emanated electromagnetic field and scent/odor may be advantageous, shall fall within the scope of the present disclosure, whether that situation involves an animal or human adversary or not. The electromagnetically shielding fabric may block or attenuate electric fields, magnetic fields, or both, and any of those alternative shall fall within the scope of the present disclosure or appended claims. It may be preferable under particular circumstances to preferentially block either electric fields or magnetic fields, and such uses are encompassed by the present disclosure or appended claims.

Figure 3A:
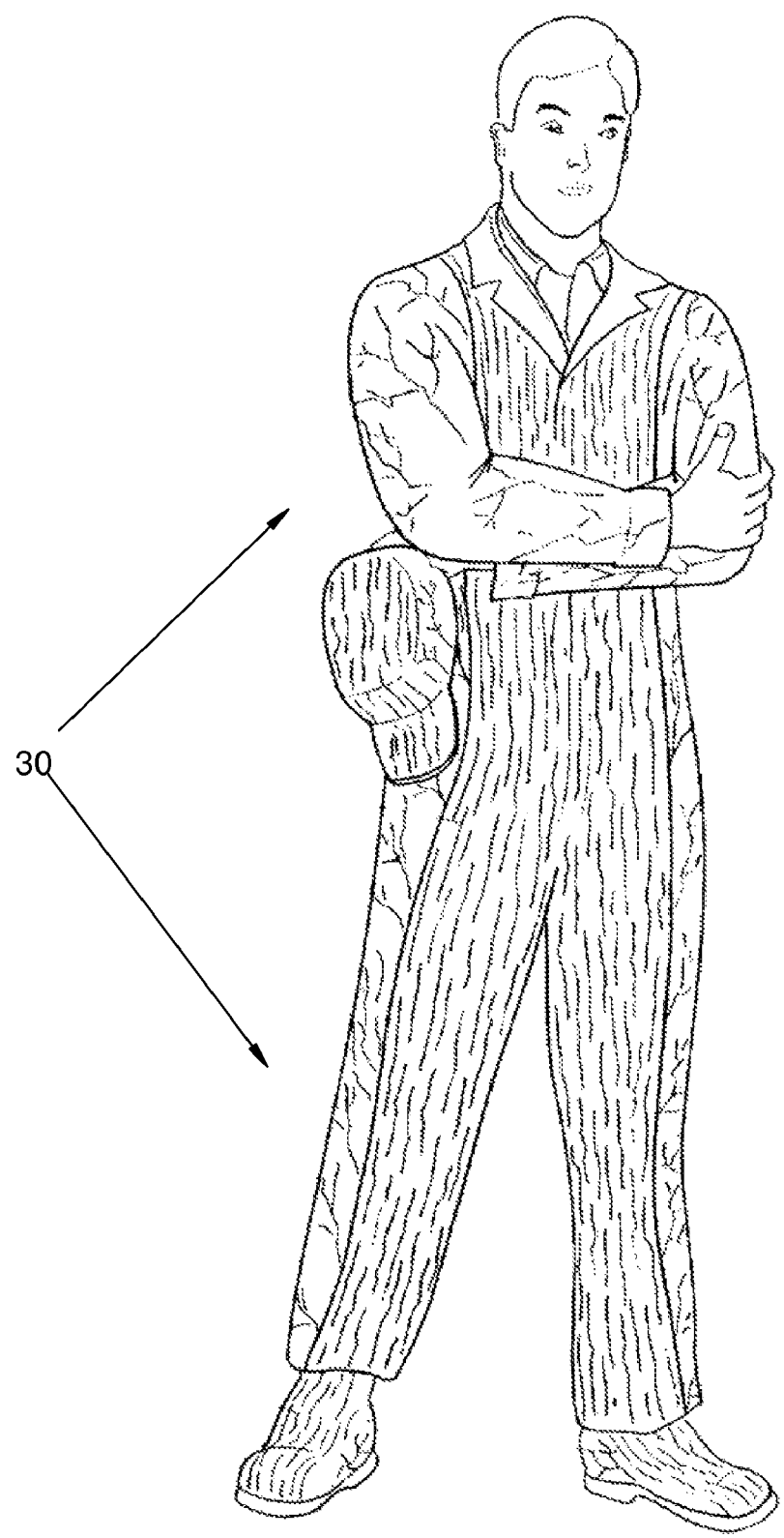
FIGS. 3A and 3B illustrate exemplary articles of electromagnetically shielding apparel that include exemplary visual camouflage patterns.
Figure 3B:
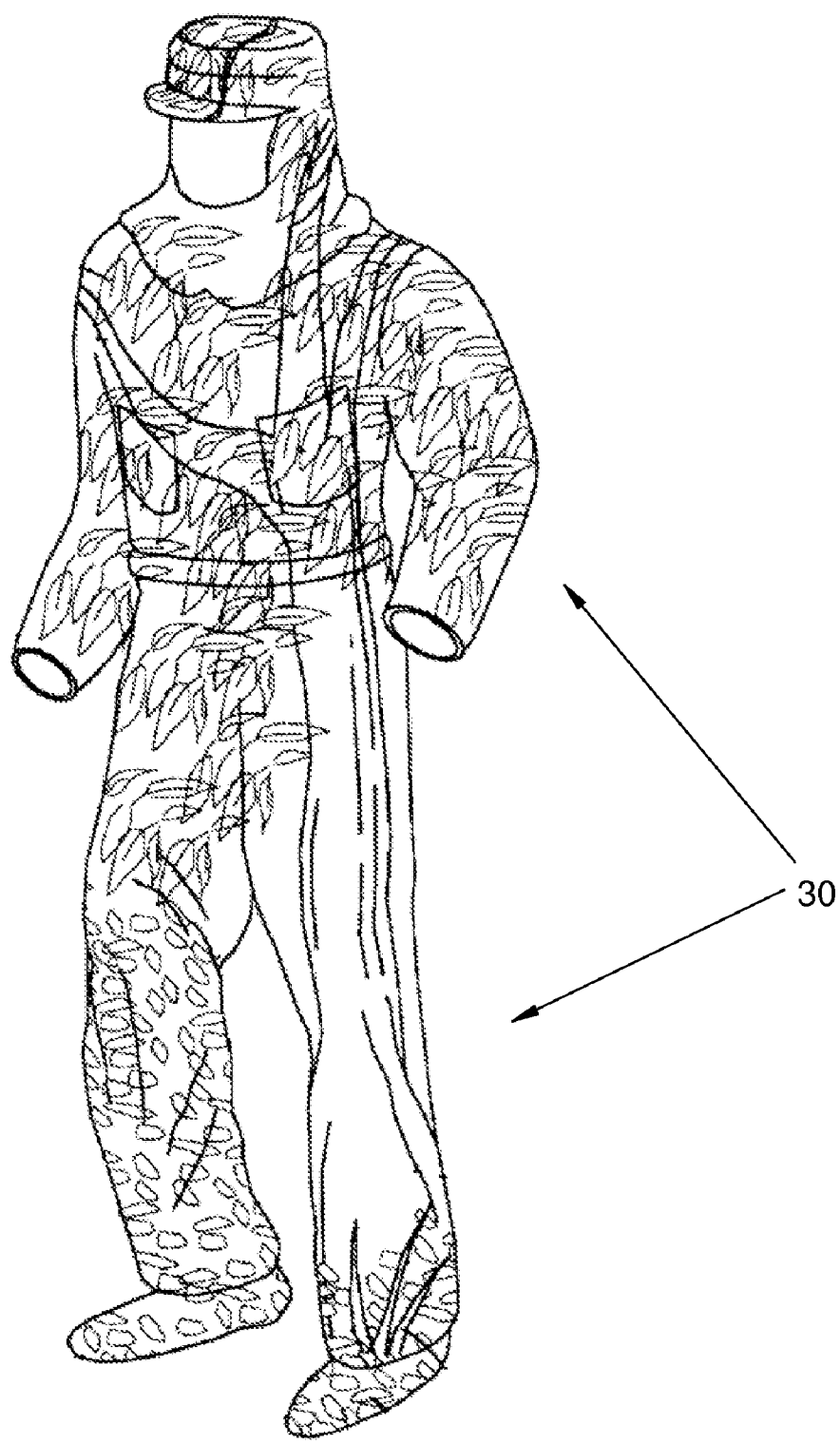

In addition to providing electromagnetic shielding, the article of apparel can also be adapted or arranged to decrease visual perception, or further decrease olfactory perception, of a hunter by a prey animal or predatory animal, of a person in a body of water by a water-borne predator, or of a person by a human adversary. For example, articles of attenuating apparel 30 can include a visual camouflage pattern on at least a portion of its outer surface (as in FIGS. 3A and 3B). Many examples of such visual camouflage are known, and some examples are disclosed in various of the incorporated references or other references cited therein. Any suitable visual camouflage pattern, including both two- and three-dimensional patterns, shall fall within the scope of the present disclosure or claims. In another example, the article of apparel can include an odor absorber, suppressant, attenuator, or blocker in addition to the conductive fibers. Some examples of these are disclosed in various of the incorporated references or other references cited therein. Any suitable odor absorber, suppressant, attenuator, or blocker used in combination with the conductive fibers (that themselves attenuate emanated scent or odor) shall fall within the scope of the present disclosure or claims. By combining electromagnetic shielding with visual camouflage or odor control, the overall likelihood that the hunter will be detected by a prey animal can be decreased, and the probability of a successful kill can be increased. Use of additional scent/odor attenuation can also reduce the likelihood that an animal or human adversary will sense (e.g., via sweat or pheromones) and react to an emotional response or the emotional state of a handler.

A number of case studies are presented in application Ser. Nos. 12/347,967, 12/347,971, and 12/428,763 (already incorporated by reference). Those case studies demonstrate the effectiveness of garments incorporating electromagnetically shielding fabric for decreasing the likelihood of detection by prey animals while hunting. In addition to the case studies, a more controlled, systematic test of the effect of electromagnetically shielding fabric on animals' perception of the electromagnetic field emanating from a human body is disclosed in a manuscript reproduced in an Appendix attached to those incorporated applications.

Another exemplary method comprises attenuating, while hunting, the electromagnetic field emanated by a hunter within a hunting blind. The hunting blind includes an actuating fabric (fields and scent/odor) of any suitable type described herein. Another method can include providing an attenuating hunting blind to a hunter and instructing that hunter to remain within the hunting blind while hunting. That method can also include constructing the attenuating hunting blind prior to providing it to the hunter. There is no teaching or suggestion in the prior art to incorporate attenuating fabric into a hunting blind, or that the incorporation of such fabrics would be desirable.

Several examples of a hunting blind are shown in application Ser. Nos. 12/347,967, 12/347,971, and 12/428,763 (already incorporated by reference). A hunting blind can include attenuating fabric arranged to attenuate the electromagnetic field and scent/odor emanating from a hunter within the hunting blind. The attenuation of the hunter's electromagnetic field and scent/odor enables prey animals to approach the blind more closely before perceiving the hunter's presence within the blind.

The hunting blind can be arranged in any suitable configuration while remaining within the scope of the present disclosure or appended claims. Many examples of hunting blinds can be found in the prior art (some of which are cited in the incorporated references), and any of them can incorporate attenuating fabric to attenuate the electromagnetic field and scent/odor emanating from a hunter within the hunting blind. The attenuating fabric can be integrated into the structure of the hunting blind, or can be provided as a add-on covering or lining for an existing hunting blind. It may be desirable in many circumstances to arrange the attenuating fabric of the hunting blind to substantially completely enclose the hunter in all directions (except for openings provided for viewing the prey and for shooting through), although such complete enclosure may not always be necessary. If the hunting blind is elevated and if such complete enclosure is desired, the attenuating fabric can be incorporated into the bottom surface of the blind (below the hunter) as well as into the blind's other surfaces. If the hunting blind rests on the ground, the attenuating fabric can be incorporated into the bottom surface of the blind, the attenuating fabric can be omitted from the bottom surface, or the blind may not even have a bottom surface; the ground can provide attenuation in a downward direction if no attenuating fabric is present below the hunter. Blinds that do not substantially enclose the hunter shall also fall within the scope of the present disclosure or appended claims. As with the articles of hunting apparel disclosed above, a hunting blind that incorporates attenuating fabric can also include a visual camouflage pattern on at least a portion of its outer surface, or can also include an additional odor absorber, suppressant, attenuator, or blocker. Any suitable fabric composition (e.g., Farabloc®) can be incorporated into a hunting blind.

It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, all instances of the words "comprising," "including," "having," and variants thereof shall be construed as open ended terminology, with the same meaning as if the phrase "at least" were appended after each instance thereof.

What is claimed is:

1. A method comprising:
    (a) attenuating, while involved in a given situation, one's own emanated electromagnetic field by wearing one or more articles of apparel that include an electromagnetically shielding fabric, which shielding fabric comprises a substantially continuous system of conductive fibers combined with a non-conductive fabric and attenuates the emanated electromagnetic field at frequencies less than about 1 gigahertz; and
    (b) attenuating, while involved in the given situation, one's own emanated scent or odor by wearing the one or more articles of apparel, wherein the conductive fibers attenuate the emanated scent or odor,
    wherein:
    (c) the given situation comprises hunting;

(d) the conductive fibers attenuate the emanated scent or odor by at least partly absorbing the scent or odor;

(e) the conductive fibers comprise carbon fibers;

(f) said attenuating of one's own emanated electromagnetic field at frequencies less than about 1 gigahertz decreases the likelihood of detection by a non-human animal while hunting; and (g) said attenuating of one's own emanated scent or odor decreases the likelihood of that emanated scent or odor affecting progress or the outcome of the given situation.

2. The method of claim 1 wherein the conductive fibers comprise multifilament carbon fiber yarn.

3. The method of claim 1 wherein the conductive fibers are intermingled with non-conductive fibers that form the non-conducting fabric.

4. The method of claim 1 wherein the conductive fibers are applied to a surface of the non-conducting fabric.

5. The method of claim 1 wherein the at least one of the articles of apparel comprises an article of clothing, footwear, or headwear.

6. The method of claim 1 wherein at least one of the articles of apparel includes a visual camouflage pattern on at least a portion of its outer surface.

7. The method of claim 1 wherein the shielding fabric includes between about 2% and about 35% by weight of the conductive fibers.

8. The method of claim 1 wherein the electromagnetically shielding fabric attenuates the emanated electromagnetic field at frequencies less than about 1 megahertz, and said attenuating of one's own emanated electromagnetic field at frequencies less than about 1 megahertz decreases the likelihood of that emanated field affecting progress or an outcome of the given situation.

9. The method of claim 1 wherein the electromagnetically shielding fabric attenuates the emanated electromagnetic field at frequencies less than about 1 kilohertz, and said attenuating of one's own emanated electromagnetic field at frequencies less than about 1 kilohertz decreases the likelihood of that emanated field affecting progress or an outcome of the given situation.

10. A method for attenuating a user's emanated electromagnetic field and the user's emanated scent or odor, the method comprising:

(a) providing to the user one or more articles of apparel that include an electromagnetically shielding fabric, which shielding fabric comprises a substantially continuous system of conductive fibers combined with a non-conductive fabric and attenuates the emanated electromagnetic field at frequencies less than about 1 gigahertz, wherein the conductive fibers attenuate the user's emanated scent or odor; and (b) instructing the user to wear, while involved in a given situation, at least one of the articles of apparel, wherein:

(c) the given situation comprises hunting;

(d) the conductive fibers attenuate the emanated scent or odor by at least partly absorbing the scent or odor;

(e) the conductive fibers comprise carbon fibers;

(f) said attenuating of the user's emanated electromagnetic field at frequencies less than about 1 gigahertz decreases the likelihood of detection of the user by a non-human animal while hunting; and (g) said attenuating of the user's emanated scent or odor decreases the likelihood of that emanated scent or odor affecting progress or the outcome of the given situation.

11. The method of claim 10 further comprising constructing at least one of the articles of apparel prior to providing it to the user.

12. The method of claim 10 wherein the conductive fibers comprise multifilament carbon fiber yarn.

13. The method of claim 10 wherein the conductive fibers are intermingled with non-conductive fibers that form the non-conducting fabric.

14. The method of claim 10 wherein the conductive fibers are applied to a surface of the non-conducting fabric.

15. The method of claim 10 wherein the at least one of the articles of apparel comprises an article of clothing, footwear, or headwear.

16. The method of claim 10 wherein at least one of the articles of apparel includes a visual camouflage pattern on at least a portion of its outer surface.

17. The method of claim 10 wherein the shielding fabric includes between about 2% and about 35% by weight of the conductive fibers.

18. The method of claim 10 wherein the electromagnetically shielding fabric attenuates the emanated electromagnetic field at frequencies less than about 1 megahertz, and said attenuating of the user's emanated electromagnetic field at frequencies less than about 1 megahertz decreases the likelihood of that emanated field affecting progress or an outcome of the given situation.

19. The method of claim 10 wherein the electromagnetically shielding fabric attenuates the emanated electromagnetic field at frequencies less than about 1 kilohertz, and said attenuating of the user's emanated electromagnetic field at frequencies less than about 1 kilohertz decreases the likelihood of that emanated field affecting progress or an outcome of the given situation.

\* \* \* \* \*